US008760994B2

(12) United States Patent
Wang et al.

(10) Patent No.: US 8,760,994 B2
(45) Date of Patent: Jun. 24, 2014

(54) UNITARY PRECODING BASED ON RANDOMIZED FFT MATRICES

(75) Inventors: Jibing Wang, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1330 days.

(21) Appl. No.: 11/553,462

(22) Filed: Oct. 26, 2006

(65) Prior Publication Data

US 2007/0097856 A1 May 3, 2007

Related U.S. Application Data

(60) Provisional application No. 60/731,301, filed on Oct. 28, 2005.

(51) Int. Cl.
*H04J 11/00* (2006.01)
(52) U.S. Cl.
USPC ........... 370/208; 370/310; 370/334; 375/257; 375/347
(58) Field of Classification Search
USPC ........... 370/208, 310, 334; 375/257, 295, 347
See application file for complete search history.

(56) References Cited

U.S. PATENT DOCUMENTS

| | | | | |
|---|---|---|---|---|
| 6,631,347 B1 * | 10/2003 | Kim et al. | | 704/222 |
| 6,873,606 B2 * | 3/2005 | Agrawal et al. | | 370/310 |
| 6,888,809 B1 * | 5/2005 | Foschini et al. | | 370/334 |
| 7,158,579 B2 | 1/2007 | Hottinen | | |
| 7,257,167 B2 * | 8/2007 | Lau | | 375/295 |
| 7,463,576 B2 * | 12/2008 | Krishnan et al. | | 370/203 |
| 7,551,547 B2 * | 6/2009 | Ghosh | | 370/208 |
| 7,587,172 B2 * | 9/2009 | Kim et al. | | 455/63.1 |
| 7,676,007 B1 * | 3/2010 | Choi et al. | | 375/347 |
| 2003/0185309 A1 * | 10/2003 | Pautler et al. | | 375/257 |
| 2004/0179467 A1 * | 9/2004 | Seeger et al. | | 370/203 |
| 2005/0007946 A1 * | 1/2005 | Barreto | | 370/203 |
| 2005/0063378 A1 * | 3/2005 | Kadous | | 370/389 |
| 2006/0182206 A1 * | 8/2006 | Coon et al. | | 375/346 |
| 2007/0010203 A1 * | 1/2007 | Wee et al. | | 455/63.1 |
| 2007/0280386 A1 * | 12/2007 | Waes et al. | | 375/347 |

FOREIGN PATENT DOCUMENTS

| | | |
|---|---|---|
| KR | 20050060094 | 6/2005 |
| WO | WO 02082689 A2 | 10/2002 |
| WO | WO-03015334 | 2/2003 |
| WO | 2004040690 | 5/2004 |

OTHER PUBLICATIONS

Gregory Raleigh et al.: "Spatio-Temporal Coding for Wireless Communication" IEEE Transactions on Communications, IEEE Service Center, Piscataway, NJ, US, vol. 46, No. 3, Mar. 1, 1998, XP011009136.

(Continued)

*Primary Examiner* — Awet Haile
(74) *Attorney, Agent, or Firm* — Dalei Dong

(57) ABSTRACT

Systems and methodologies are described that facilitate constructing unitary matrices that may be utilized in linear precoding for multiple-input multiple-output (MIMO) wireless communication systems. Each unitary matrix may be generated by combining (e.g., multiplying) a diagonal matrix with a Discrete Fourier Transform (DFT) matrix. The unitary matrices may be utilized to provide feedback related to a channel and/or control transmission over a channel based upon obtained feedback.

20 Claims, 11 Drawing Sheets

(56) References Cited

OTHER PUBLICATIONS

Vasylyshyn V I: "High-resolution phased array signal processing via dft beanspace tis-esprit with structure weighting" Phased Array Systems and Technology, 2003., IEEE International Symposium on Oct. 14-17, 2003, Piscataway, NJ, USA, IEEE, Oct. 14, 2003 pages.
International Search Report—PCT/US06/060374, International Search Authority—European Patent Office—Mar. 20, 2009.
Written Opinion—PCT/US06/060374, International Search Authority—European Patent Office—Mar. 20, 2009.
Taiwanese Search Report—095139923—TIPO—Apr. 27, 2010.
Love, et.al.,"Limited Feedback Unitary Precoding for Orthogonal Space-time Block Codes", IEEE Transaction on Signal Processing, vol. 53, No. 1, Jan. 2005, pp. 64-73.

* cited by examiner

UNITARY PRECODING BASED ON RANDOMIZED FFT MATRICES

CROSS-REFERENCE TO RELATED APPLICATIONS

This application claims the benefit of U.S. Provisional Patent application Ser. No. 60/731,301 entitled "A METHOD AND APPARATUS FOR PRECODING" which was filed Oct. 28, 2005. The entirety of the aforementioned application is herein incorporated by reference.

BACKGROUND

I. Field

The following description relates generally to wireless communications, and more particularly to generating unitary matrices that can be utilized in connection with linear precoding in a wireless communication system.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and received antennas are utilized.

MIMO systems may support various duplexing techniques to divide forward and reverse link communications over a common physical medium. For instance, frequency division duplex (FDD) systems may utilize disparate frequency regions for forward and reverse link communications. Further, in time division duplex (TDD) systems, forward and reverse link communications may employ a common frequency region. However, conventional techniques may provide limited or no feedback related to channel information. Further, transmissions over a channel oftentimes fail to be tailored based upon conditions and/or properties of the channel.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection facilitating construction of unitary matrices that may be utilized in linear precoding for multiple-input multiple-output (MIMO) wireless communication systems. Each unitary matrix may be generated by combining (e.g., mutiplying) a diagonal matrix with a Discrete Fourier Transform (DFT) matrix. The unitary matrices may be utilized to provide feedback related to a channel and/or control transmission over a channel based upon obtained feedback.

According to related aspect, a method that facilitates providing channel related feedback for precoding in a wireless communication system is described herein. Thee method may comprise constructing a set of unitary matrices, each of the unitary matrices being generated based upon a diagonal matrix and a Discrete Fourier Transform (DFT) matrix. Further, the method may include selecting a particular unitary matrix from the set of unitary matrices based upon an estimate of a forward link channel. Moreover, the method may comprise transmitting an index associated with the particular unitary matrix via a reverse link channel.

Another aspect relates to a wireless communications apparatus. The wireless communications apparatus may include a memory that retains instructions for generating a set of unitary matrices based upon a combination of diagonal matrices and Discrete Fourier Transform (DFT) matrices and yielding channel related feedback for precoding selected from the set of unitary matrices. Further, the communications apparatus may comprise a processor, coupled to the memory, configured to execute the instructions retained in the memory.

Yet another aspect relates to a wireless communications apparatus that generates unitary matrices and provides channel related feedback for precoding. The wireless communications apparatus may include means for constructing a set of unitary matrices based upon diagonal matrices and Discrete Fourier Transform (DFT) matrices; means for selecting a particular unitary matrix from the set of unitary matrices based upon a channel estimate; and means for transmitting an index associated with the particular unitary matrix via a reverse link channel.

Still another aspect relates to a machine-readable medium having stored thereon machine-executable instructions for generating a set of unitary matrices, each of the unitary matrices being constructed as a function of a diagonal matrix and a Discrete Fourier Transform (DFT) matrix, estimating a forward link channel to yield a channel estimate, and identifying a particular unitary matrix from the set of unitary matrices based upon the channel estimate. The machine-readable medium may further have stored thereon machine-executable instructions for determining an index of the particular unitary matrix selected from the set of unitary matrices and transmitting the index via a reverse link channels.

In accordance with another aspect, an apparatus in a wireless communication system may include a processor, wherein the processor may be configured to generate a codebook of unitary matrices based upon diagonal matrices and Discrete Fourier Transform (DFT) matrices. Further, the processor may be configured to determine a particular unitary matrix to feedback for utilization in precoding based upon an evaluation of a forward link channel. Moreover, the processor may be configured to send an index associated with the particular unitary matrix to a base station via a reverse link channel.

According to a further aspect, a method that facilitates controlling transmission in response to feedback, in a wireless communication system is described herein. The method may comprise constructing a set of unitary matrices, each of the unitary matrices being generated based upon a diagonal matrix and a Discrete Fourier Transform (DFT) matrix. Further, the method may include identifying a selected unitary matrix from the set of unitary matrices based upon a received index. Additionally, the method may include modifying transmission over a forward link channel based upon the selected unitary matrix.

Another aspect relates to a wireless communications apparatus. The wireless communications apparatus may include a memory that retains instructions for constructing a set of unitary matrices based upon a combination of diagonal matrices and Discrete Fourier Transform (DFT) matrices, identifying a particular unitary matrix from the set based upon an obtained index, and controlling transmission over a forward link channel based upon the particular unitary matrix. Further, the wireless communications apparatus may include a processor, coupled to the memory, configured to execute the instructions retained in memory.

Still another aspect relates to a wireless communications apparatus that constructs unitary matrices and controls transmission over a channel. The wireless communications apparatus may include means for generating a set of unitary matrices based upon diagonal matrices and Discrete Fourier Transform (DFT) matrices, means for identifying a selected unitary matrix from the set of unitary matrices based upon a received index, and means for controlling transmission over a forward link channel based upon the selected unitary matrix.

Yet another aspect relates to a machine-readable medium having stored thereron machine-executable instructions for obtaining a diagonal matrix; obtaining a Discrete Fourier Transform (DFT) matrix; and combining the diagonal matrix and the DFT matrix to yield a unitary matrix utilized in connection with linear precoding.

In accordance with another aspect, an apparatus in a wireless communication system may include a processor, wherein the processor may be configured to build a codebook that includes a set of unitary matrices based upon diagonal matrices and Discrete Fourier Transform (DFT) matrices, determine a selected unitary matrix from the set of unitary matrices based upon a received index, and adapt transmission over a forward link channel based upon the selected unitary matrix.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however of but a few of the various ways in which the principles of various embodiments may be employed and the described embodiments are intended to include all such aspects and their equivalents.

DETAILED DESCRIPTION

Figure 1:
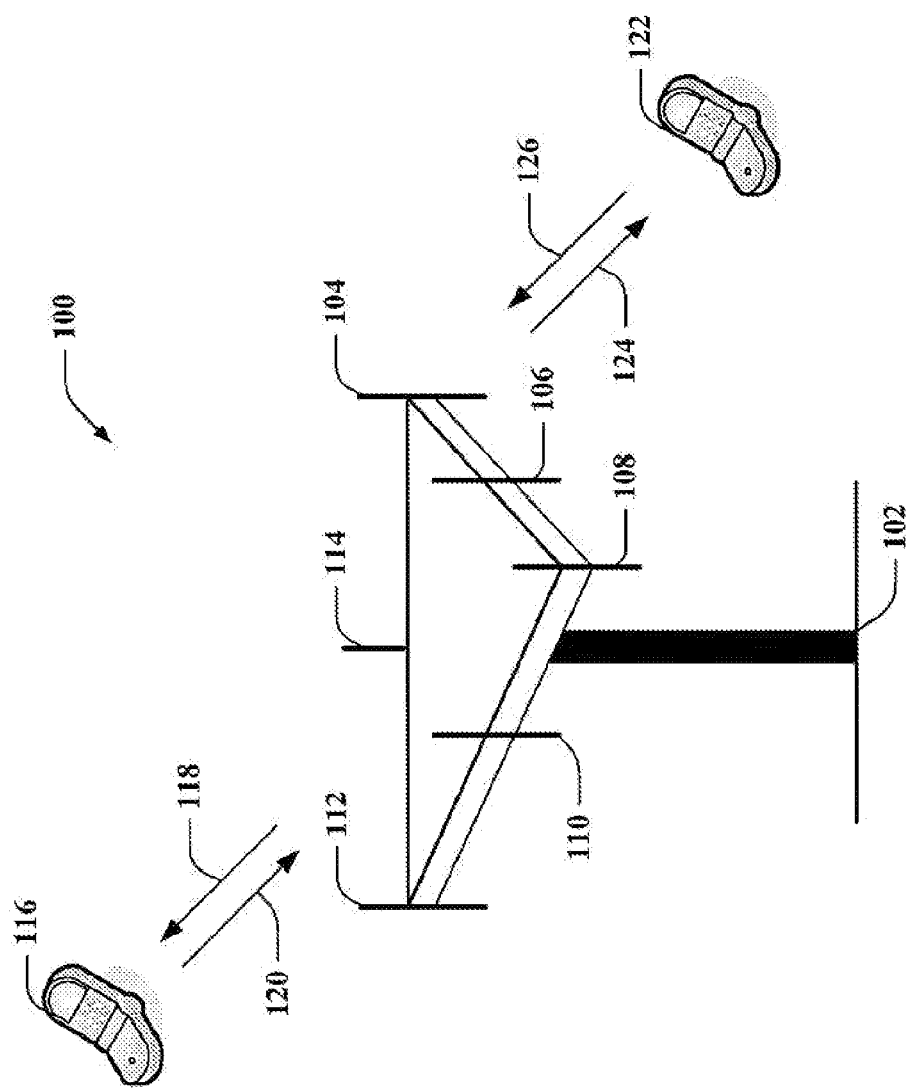
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that may include multiple antenna groups. For example, one antenna group may include antennas 104 and 106, another group may comprise antennas 108 and 110, and an additional group may include antennas 112 and 114. Two antennas are illustrated for each antenna group; however, more or fewer antennas may be utilized for each group. Base station 102 may additional include a transmitter chain and a receiver chain, each of which can in turn comprise a plurality of components associated with signal transmissions and reception (e.g., processors, modulators, multiplexers, demodulators, demutiplexers, antennas, etc.), as will be appreciated by one skilled in the art.

Base station 102 may communicate with one or more mobile devices such as mobile device 116 and mobile device 122; however, it is to be appreciated that base station 102 may communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 may utilize a different frequency band than that used by reverse link 120, and forward link 124 may employ a different frequency band than that employed by reverse link 126, for example. Further, in a time division duplex (TDD) system, forward link 118 and reverse link 120 may utilize a common frequency band and forward link 124 and reverse link 126 may utilize a common frequency band.

Each group of antennas and/or the area in which they are designated to communicate may be referred to as a sector of base station 102. For example, antenna groups may be designed to communicate to mobile devices in a sector of the areas covered by base station 102. In communication over forward links 118 and 124, the transmitting antennas of base station 102 may utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells may be subject to less interference as compared to a base station transmitting through a single antenna to all its mobile devices.

According to an example, system 100 may be a multiple-input multiple-output (MIMO) communication system. Further, system 100 may utilize any type of duplexing such as FDD, TDD, etc. Pursuant to an illustration, base station 102 may transmit over forward links 118 and 124 to mobile devices 116 and 122. Moreover, mobile devices 116 and 122 may estimate respective forward link channels and generate corresponding feedback that may be provided to base station 102 via reverse links 120 and 122. Linear precoding techniques may be effectuated (e.g., by base station 102) based upon the channel related feedback; thus, subsequent transmissions over the channel may be controlled by utilizing the channel related feedback (e.g., beamforming gain may be obtained by employing linear precoding).

Base station 102 and mobile devices 116 and 122 may employ common codebooks to provide and/or analyze feedback (e.g., quantize estimated channel(s)). The codebooks may each include a set of N unitary matrices, where N may be any integer. For instance, the common codebooks shared by base station 102 and mobile device 116 (and/or mobile device 122) may include $N=2^M$ unitary matrices, where M may be the number of bits feedback from a receiver (e.g., mobile device(s) 116 and 122) to a transmitter (e.g., base station 102) to index the precoding matrix. Pursuant to an example, base station 102 and/or mobile devices 116 and 122 may construct the unitary matrices of the codebooks. Additionally or alternatively, the unitary matrices may be constructed and distributed to base station 102 and/or mobile devices 116 and 122.

According to an illustration, mobile devices 116 and 122 may estimate forward link channels (e.g., to yield a channel matrix) and compare the channel estimates with unitary matrices included in the codebooks to select particular unitary matrices (e.g., closest) from the codebooks (e.g., to quantize the unitary part of the channel matrix). Thereafter, indices associated with the selected unitary matrices may be transmitted to base station 102. Base station 102 may employ the received indices to identify the selected unitary matrices, which may be utilized to control communication over forward links 118 and 124 (e.g., for beamforming). By employing the unitary matrices as described herein, transmission power of each transmit antenna may be substantially equal regardless of a number of streams transmitted.

Figure 2:
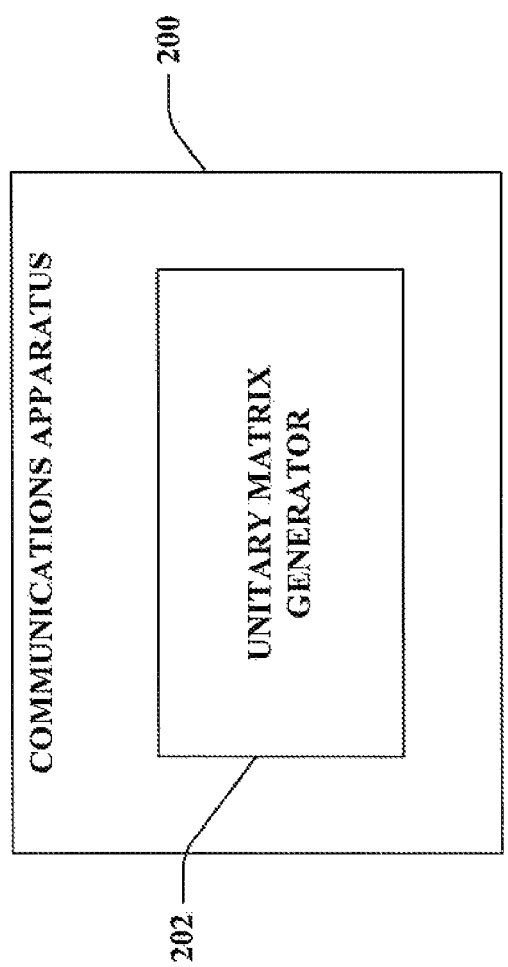
FIG. 2 is an illustration of an example communications apparatus for employment within a wireless communications environment.

Turning to FIG. 2, illustrated is a communications apparatus 200 for employment within a wireless communications environment. Communications apparatus 200 may be a base station or a portion thereof or a mobile device or a portion thereof. Communications apparatus 200 may include a unitary matrix generator 202 that constructs unitary matrices that can be utilized in connection with linear precoding. For instance, the unitary matrices may be utilized in a MIMO wireless communications system. Moreover, the unitary matrices yielded by unitary matrix generator 202 may form a codebook, which may be substantially similar to a codebook of a disparate communications apparatus with which communications apparatus 200 interacts. Although not depicted, it is contemplated that unitary matrix generator 202 may be separate from communications apparatus 200; according to this example, unitary matrix generator 202 may construct and transfer the unitary matrices to communications apparatus 200. Pursuant to another example, communications apparatus 200 may construct a codebook of unitary matrices with unitary matrix generator 202 and thereafter provide the constructed codebook to a disparate communications apparatus; however, is it to be appreciated that the claimed subject matter is not so limited to the aforementioned examples.

By way of example, communications apparatus 200 may be a base station that constructs a codebook of unitary matrices with unitary matrix generator 202. The base station may obtain an index related to the codebook of unitary matrices from a mobile device, where the index may be selected from a substantially similar codebook of unitary matrices associated with the mobile device. Additionally or alternatively, communications apparatus 200 may be a mobile device that generates a codebook of unitary matrices by leveraging unitary matrix generator 202. According to this illustration, the mobile device may estimate a channel and utilized the unitary matrices to quantize the channel estimate. For instance, a particular unitary matrix that corresponds to the channel estimate may be selected from the set of unitary matrices yielded by unitary matrix generator 202 and an index that pertains to the selected unitary matrix may be transmitted to a base station (e.g., that employs a substantially similar codebook including a substantially similar set of unitary matrices).

Unitary matrix generator 202 may yield unitary matrices for utilization in TDD wireless communications systems, FDD wireless communications systems, and the like. Unitary matrix generator 202 may construct a set of unitary matrices such as $\{U_k\}_{k=1}^N$, where N may be any integer. Further, $N=2^M$, where M may be a number of bits of feedback. Pursuant to an example, N may be 64 and accordingly 6 bits of feedback (e.g., associated with an index) may be transferred from a receiver (e.g., mobile device) to a transmitter (e.g., base station); however, the claimed subject matter is not limited to the aforementioned example.

Unitary matrix generator 202 may generate and/or obtain a diagonal matrix and a Discrete Fourier Transform (DFT) matrix. Further, unitary matrix generator 202 may construct each of the unitary matrices by multiplying a DFT matrix by a diagonal matrix. According to an illustration, the diagonal matrix may be associated with a random phase. For example, unitary matrix generator 202 may evaluate $$U_k = \begin{bmatrix} e^{j2\pi\phi_{k,1}} & \cdots & 0 \\ \vdots & \ddots & \vdots \\ 0 & \cdots & e^{j2\pi\phi_{k,M_T}} \end{bmatrix} F_{M_T \times L} \text{ or } U_k =$$

$$F_{M_T \times L} \begin{bmatrix} e^{j2\pi\phi_{k,1}} & \cdots & 0 \\ \vdots & \ddots & \vdots \\ 0 & \cdots & e^{j2\pi\phi_{k,1}} \end{bmatrix}$$

to determine the unitary matrices, where $M_T$ may be a number of transmit antennas and L may be a rank and/or number of space-time codes (e.g., spatial multiplexing streams). Further, $\{\phi_{i,j}\}_{i=1}^{M_T}$ may be random variables in (0, 1), and columns of F may be orthonormal and chosen from columns of a DFT matrix.

According to a further illustration, unitary matrix generator 202 may evaluate the DFT matrix such as $$F_{M_T \times L} = \frac{1}{\sqrt{M_T}} \left[ e^{\frac{-j2\pi n l}{M_T}} \right],$$

where n may be from 0 to $M_T-1$ and l may be from 0 to L−1. Pursuant to an example where 4 transmit antennas are employed (e.g., by a base station) and 2 receive antennas are utilized (e.g., by a mobile device), $M_T$ may be equal to 4 and L may be equal to 2. In accordance with this example, unitary matrix generator 202 may generate a DFT matrix such as $$F_{M_T \times L} = \frac{1}{2} \begin{bmatrix} 1 & 1 \\ 1 & -j \\ 1 & -1 \\ 1 & j \end{bmatrix},$$

and unitary matrix generator 202 may multiply this DFT matrix by the diagonal matrix to yield a unitary matrix $$U_K = \begin{bmatrix} u_{11} & u_{12} \\ u_{21} & u_{22} \\ u_{31} & u_{32} \\ u_{41} & u_{42} \end{bmatrix}.$$

Moreover, although not shown, it is to be appreciated that communications apparatus 200 may include memory that retains various instructions with respect to generating unitary matrices, yielding channel related feedback based upon unitary matrices, employing feedback associated with unitary matrices (e.g., to control subsequent transmission over a channel), and the like. Further, communications apparatus 200 may include a processor that may be utilized in connection with executing the instructions (e.g., instructions retained within memory, instructions obtained from a disparate source, . . . ).

Figure 3:
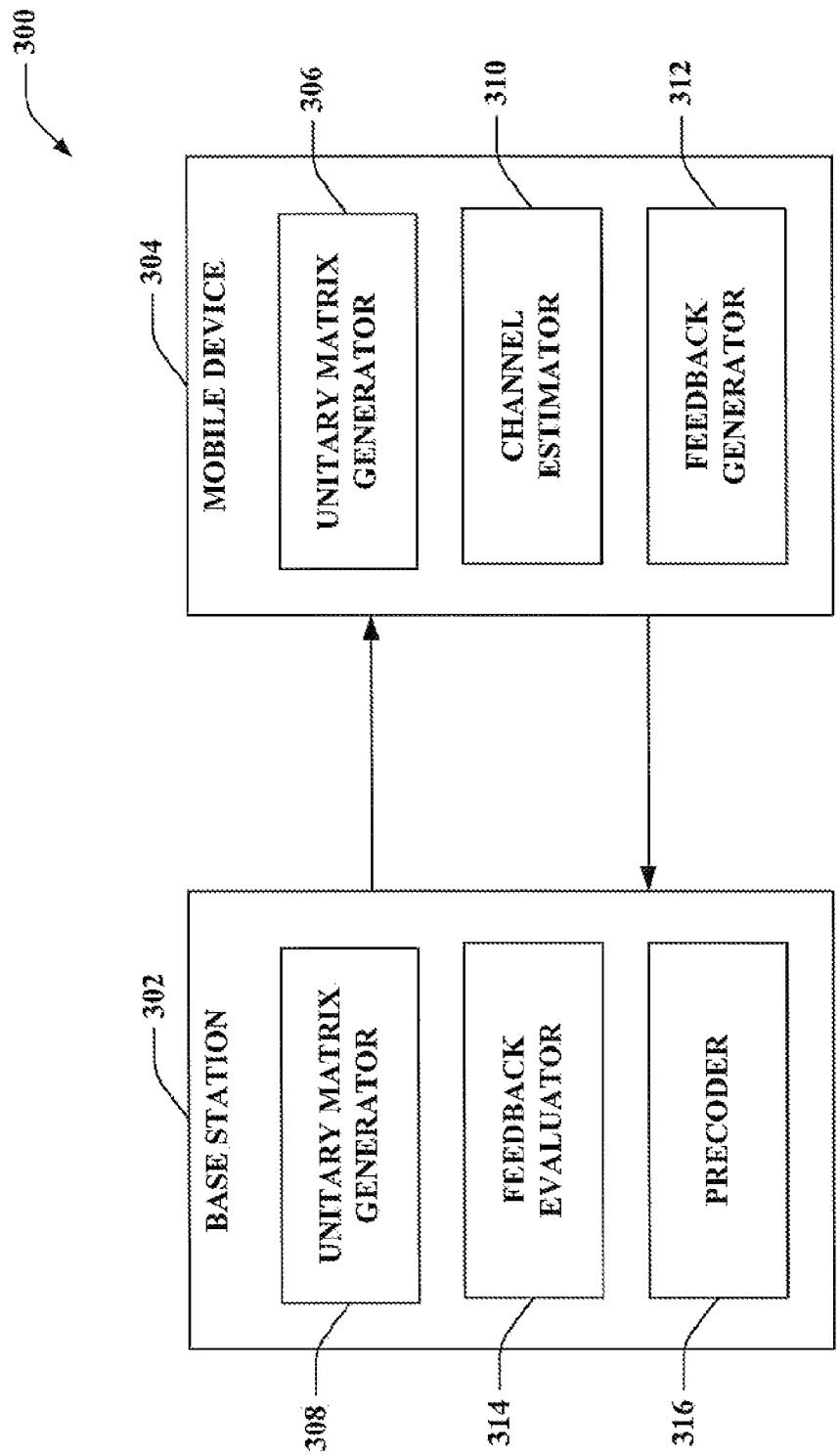
FIG. 3 is an illustration of an example system that effectuates unitary precoding in a wireless communication environment.

Now referring to FIG. 3, illustrated is a system 300 that effectuates unitary precoding in a wireless communication environment. System 300 includes a base station 302 that communicates with a mobile device 304 (and/or any number of disparate mobile devices (not shown)). Base station 302 may transmit information to mobile device 304 over a forward link channel; further, base station 302 may receive information from mobile device 304 over a reverse link channel. Further, system 300 may be a MIMO system. According to an example, mobile device 304 may provide feedback related to the forward link channel via the reverse link channel, and base station 302 may utilize the feedback to control and/or modify subsequent transmission over the forward link channel (e.g., employed to facilitate beamforming).

Mobile device 304 may include a unitary matrix generator 306 that constructs unitary matrices by multiplying diagonal matrices by DFT matrices as described above. Further, base station 302 may include a unitary matrix generator 308 that may be substantially similar to unitary matrix generator 306. Accordingly, base station 302 and mobile device 304 may obtain substantially similar codebooks that include a common set of unitary matrices yielded by unitary matrix generators 306 and 308. Although not depicted, it is to contemplated that unitary matrix generator 306 may construct the codebook for mobile device 304, and the codebook may be provided to base station 302, for example. Pursuant to another illustration, unitary matrix generator 308 may yield the codebook for base station 302, which may transfer the codebook to mobile device 304. Moreover, a disparate apparatus may generate the codebook of unitary matrices and provide the codebook to both base station 302 and mobile device 304; however the claimed subject matter is not limited to the aforementioned examples.

Mobile device 304 may further include a channel estimator 310 and a feedback generator 312. Channel estimator 310 may estimate the forward link channel from base station 302 to mobile device 304. Channel estimator 310 may generate a matrix H that corresponds to the forward link channel, where columns of H may relate to transmit antennas of base station 302 and rows of H may pertain to receive antennas at mobile device 304. According to an example, base station 302 may utilize four transmit antennas and mobile device 304 may employ two receive antennas, and thus, channel estimator 310 may evaluate the forward link channel to yield a two-by-four channel matrix H (e.g., where $$\left(\text{e.g., where } H = \begin{bmatrix} h_{11} & h_{12} & h_{13} & h_{14} \\ h_{21} & h_{23} & h_{23} & h_{24} \end{bmatrix}\right);$$

however, it is to be appreciated that the claimed subject matter contemplates utilizing any size (e.g., any number of rows and/or columns) channel matrix H (e.g., corresponding to any number of receive and/or transmit antennas).

Feedback generator 312 may employ the channel estimate (e.g., channel matrix H) to yield feedback that may be transferred to base station 302 over the reverse link channel. According to an example, feedback generator 312 (and/or channel estimator 310) may effectuate eigen decomposition of the channel matrix H to yield a corresponding channel unitary matrix U. For instance, the channel unitary matrix U may include information related to direction of the channel determined from the estimated channel matrix H. Eigen decomposition of the channel matrix H may be effectuated based upon $H^H H = U^H \Lambda U$, where U may be a channel unitary matrix corresponding to the channel matrix H, $H^H$ may be the conjugate transpose of H, $U^H$ may be the conjugate transpose of U, and $\Lambda$ may be a diagonal matrix.

Moreover, feedback generator 312 may compare the channel unitary matrix U to the set of unitary matrices constructed via unitary matrix generator 306 (e.g., to quantize the channel unitary matrix U). Further, a selection may be made from the set of unitary matrices. An index associated with the selected unitary matrix from the set may be identified by feedback generator 312. Moreover, feedback generator 312 may provide the index to base station 302 via the reverse link channel.

Base station 302 may further include a feedback evaluator 314 and a precoder 316. Feedback evaluator 314 may analyze the feedback (e.g., the obtained index associated with the quantized information) received from mobile device 304. For example, feedback evaluator 314 may utilize the codebook of unitary matrices generated by unitary matrix generator 308 to identify the selected unitary matrix based upon the received index; thus, the unitary matrix identified by feedback evaluator 314 may be substantially similar to the unitary matrix selected by feedback generator 312.

Further, precoder 316 may be utilized by base station 302 to alter subsequent transmissions over the forward link channel based upon the unitary matrix identified by feedback evaluator 314. For example, precoder 316 may perform beamforming for forward link communications based upon the feedback. According to a further example, precoder 316 may multiply the identified unitary matrix by a transmit vector associated with the transmit antennas of base station 302. Further, transmission power for each transmit antenna employing a unitary matrix constructed as described herein (e.g., by unitary matrix generators 306 and 308) may be substantially similar (as opposed to conventional techniques that may utilize a randomly generated unitary matrix that may lead to antennas utilizing disparate power levels).

According to an example, precoding and space division multiple access (SDMA) Codebooks Precoding and SDMA may be a mapping between effective antenna and tile antennas. A particular mapping may be defined by a precoding matrix. The columns of the precoding matrix may define a set of spatial beams that can be used by base station 302. Base station 302 may utilize one column of the precoding matrix in SISO transmission, and multiple columns in STTD or MIMO transmissions.

Mobile device 304 may choose to feedback a preferred precoding matrix to be used by base station 302 for future transmissions. The set of such precoding matrices forms a codebook. A number of example precoding/SDMA codebooks are described herein and corresponding values of BFCHBeamCodeBookIndex may be defined in an Overhead Messages protocol. It is to be appreciated that the claimed subject matter is not limited to the following examples. Some of the precoding matrices in a codebook may be grouped into clusters. Matrices in a single cluster may span a part of the space. If mobile device 304 feeds back a beam index within a cluster, base station 302 treats this as an indication that it may schedule other mobile devices on different clusters.

A BeamIndex field, in a BFCHBeamIndex report, may index a beam in a codebook specified by BFCHBeamCodeBookIndex. The BeamIndex may indicate one or more of the following: A no preferred precoding or SDMA matrix, a preferred SISO precoding or SDMA transmission on a spatial beam, a preferred STTD precoding or SDMA transmission on two spatial beams, and a preferred MIMO precoding or SDMA transmission on a set of spatial beams (more than one column of the precoding matrix).

It may be understood that, if the codebook supports MIMO, the $0^{th}$ to (SpatialOrder-1)$^{th}$ columns of the precoding matrix may be used, where SpatialOrder is defined in the Forward Traffic Channel MAC protocol. If a spatial beam $w = \lfloor w_0 \, w_1 \, \ldots \, w_{N_{EFT\_TX\_ANT}-1} \rfloor^T$, is used to transmit a modulation symbol s, then $w_j$s is transmitted on effective antenna j, where $N_{EFT\_TX\_ANT}$ is equal to the parameter EffectiveNumAntenna maintained in the overhead messages protocol, and T is the matrix transpose.

In the sequel i may indicate the imaginary part in a complex number.

BFCHBeamCodeBookIndex=0000. This codebook may be valid for SISO transmission and $N_{EFT\_TX\_ANT}=4$. BeamIndex=0. Mobile device 304 does not prefer a specific precoding matrix and rather prefers a random matrix that is chosen by base station 302. The random matrix may change at a rate chosen by base station 302.

Cluster 1. BeamIndex=1: $[0.5\ 0.5i\ -0.5\ -0.5i]^T$

Cluster 2. BeamIndex=2: $[0.5\ -0.5i\ -0.5\ 0.5i]^T$

BFCHBeamCodeBookIndex=0001. In an aspect, a codebook may be valid for SISO and MIMO transmissions if $N_{EFT\_TX\_ANT}=4$ Let $BeamMat =$ $$\begin{bmatrix} 0.5000 & 0.5000 & 0.5000 & 0.5000 \\ 0.3536+0.3536i & -0.3536+0.3536i & 0.3536-0.3536i & -0.3536-0.3536i \\ 0.0000+0.5000i & -0.0000-0.5000i & 0.0000-0.5000i & -0.0000+0.5000i \\ -0.3536+0.3536i & 0.3536+0.3536i & -0.3536-0.3536i & 0.3536-0.3536i \end{bmatrix}$$

The codebook may be defined as follows:

BeamIndex=0: Mobile device 304 does not prefer a specific precoding matrix and rather prefers a random matrix that is chosen by base station 302. The random matrix may change at a rate chosen by base station 302. It should be understood that the above numerical values are provided as an example, and the claimed subject matter is not so limited.

BeamIndex=1: Zero$^{th}$ column in BeamMat

BeamIndex=2: First column in BeamMat

BeamIndex=3: Second column in BeamMat

BeamIndex=4: Third column in BeamMat

Precoding Matrices

According to an example, BeamIndex=5 to BeamIndex=35: If the BeamIndex is equal to j, define $seed_{k,j}=(2\pi[BIT\_REVERSE([(4*j+k)*2654435761]\ mod\ 2^{32})]\ mod\ 2^{20})/2^{20}$, k=0,1,2,3. The corresponding precoding matrix, $U_j$, may be a random unitary matrix defined as $U_j=\Lambda_j D$, where $\Lambda_j$ is a diagonal matrix of the form $$\begin{bmatrix} e^{j\phi_0} & 0 & 0 & 0 \\ 0 & e^{j\phi_1} & 0 & 0 \\ 0 & 0 & e^{j\phi_2} & 0 \\ 0 & 0 & 0 & e^{j\phi_3} \end{bmatrix}, \phi_k = seed_{k,j}$$

is a uniform random variable between 0 and $2\pi$, and D is the 4×4 DFT matrix $$\left(e.g., D = \{D_{m,n}, m, n = 0, \ldots, 3\}, D_{m,n} = \frac{1}{\sqrt{4}}e^{j2\pi mn/4}\right).$$

Cluster 1. In an aspect, BeamIndex=36 to BeamIndex=49: If the BeamIndex is equal to j, define $seed_{k,j}=(2\pi[BIT\_REVERSE([(2*j+k)*2654435761]\ mod\ 2^{32})]\ mod\ 2^{20})/2^{20}$, k=0,1. The corresponding precoding matrix is defined as BeamMat(:,0:1)*$U_j$, where BeamMat(:,0:1) is the zero$^{th}$ and first columns of BeamMat, $$U_j = \Lambda_j D, \Lambda_j = \begin{bmatrix} e^{j\phi_0} & 0 \\ 0 & e^{j\phi_1} \end{bmatrix}, \phi_k = seed_{k,j}$$

is a uniform random variable between 0 and $2\pi$, and D is a 2×2 DFT matrix (e.g., $$\left(e.g., D = \{D_{m,n}, m, n = 0, 1\}, D_{m,n} = \frac{1}{\sqrt{2}}e^{j2\pi mn/2}\right).$$

Cluster 2. In an aspect, BeamIndex=50 to BeamIndex=63: If the BeamIndex is equal to j, define $seed_{k,j}=(2\pi[BIT\_REVERSE([(2*j+k)*2654435761]\ mod\ 2^{32})]\ mod\ 2^{20})/2^{20}$, k=0,1. The corresponding precoding matrix is defined as BeamMat(:,2:3)*$U_j$, where BeamMat(:,2:3) is the second and third columns of BeamMat, $$U_j = \Lambda_j, D, \Lambda_j = \begin{bmatrix} e^{j\phi_0} & 0 \\ 0 & e^{j\phi_1} \end{bmatrix}, \phi_k = seed_{k,j}$$

is a uniform random variable between 0 and $2\pi$, and D is a 2×2 DFT matrix $$\left(e.g., D = \{D_{m,n}, m, n = 0, 1\}, D_{m,n} = \frac{1}{\sqrt{2}}e^{j2\pi mn/2}\right).$$

It is to be appreciated that the foregoing is provided as one or more examples; however, the claimed subject matter is not so limited.

Figure 4:
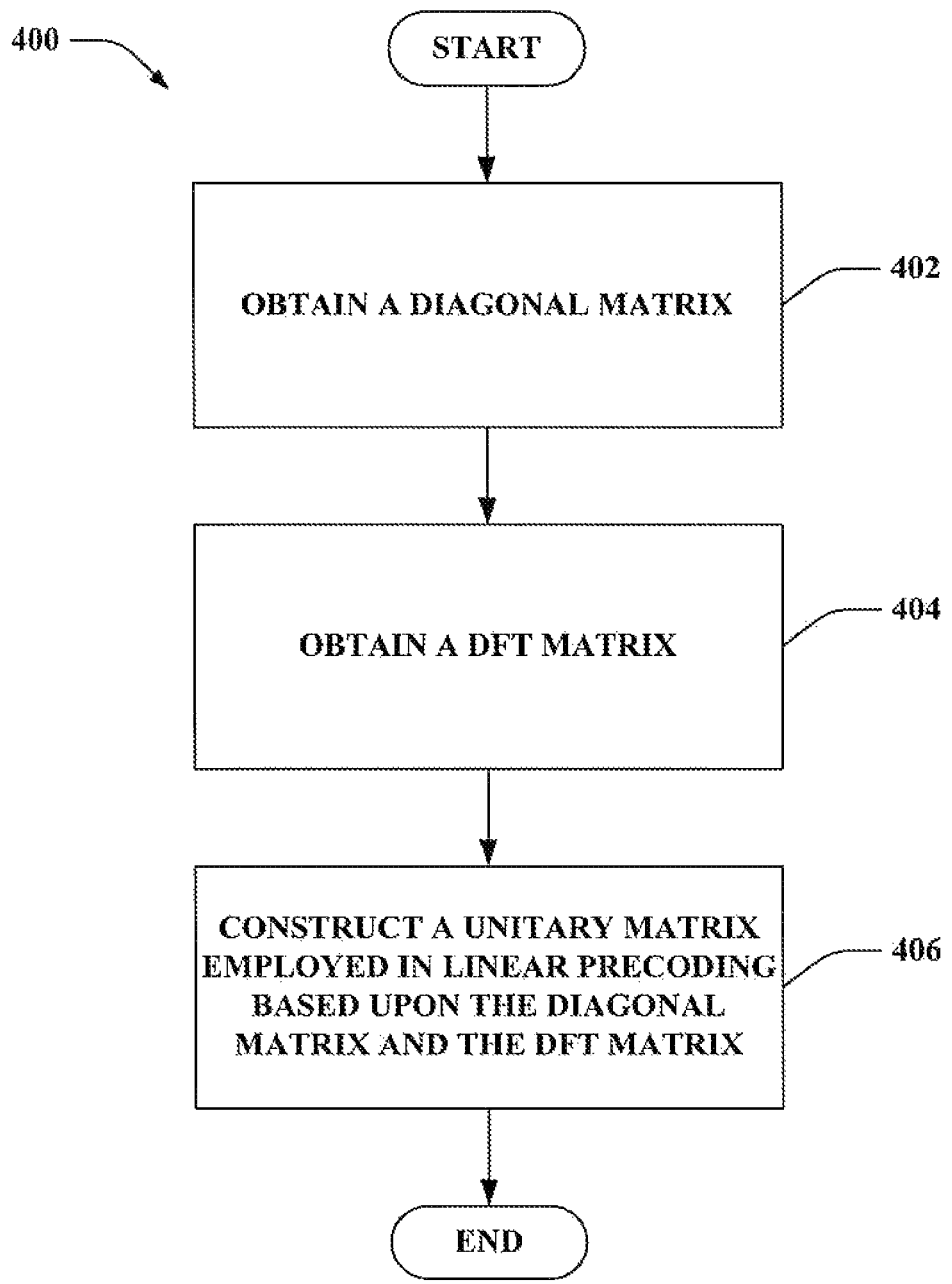
FIG. 4 is an illustration of an example methodology that facilitates yielding one or more unitary matrices that may be utilized in linear precoding in a MIMO wireless communication system.
Figure 5:
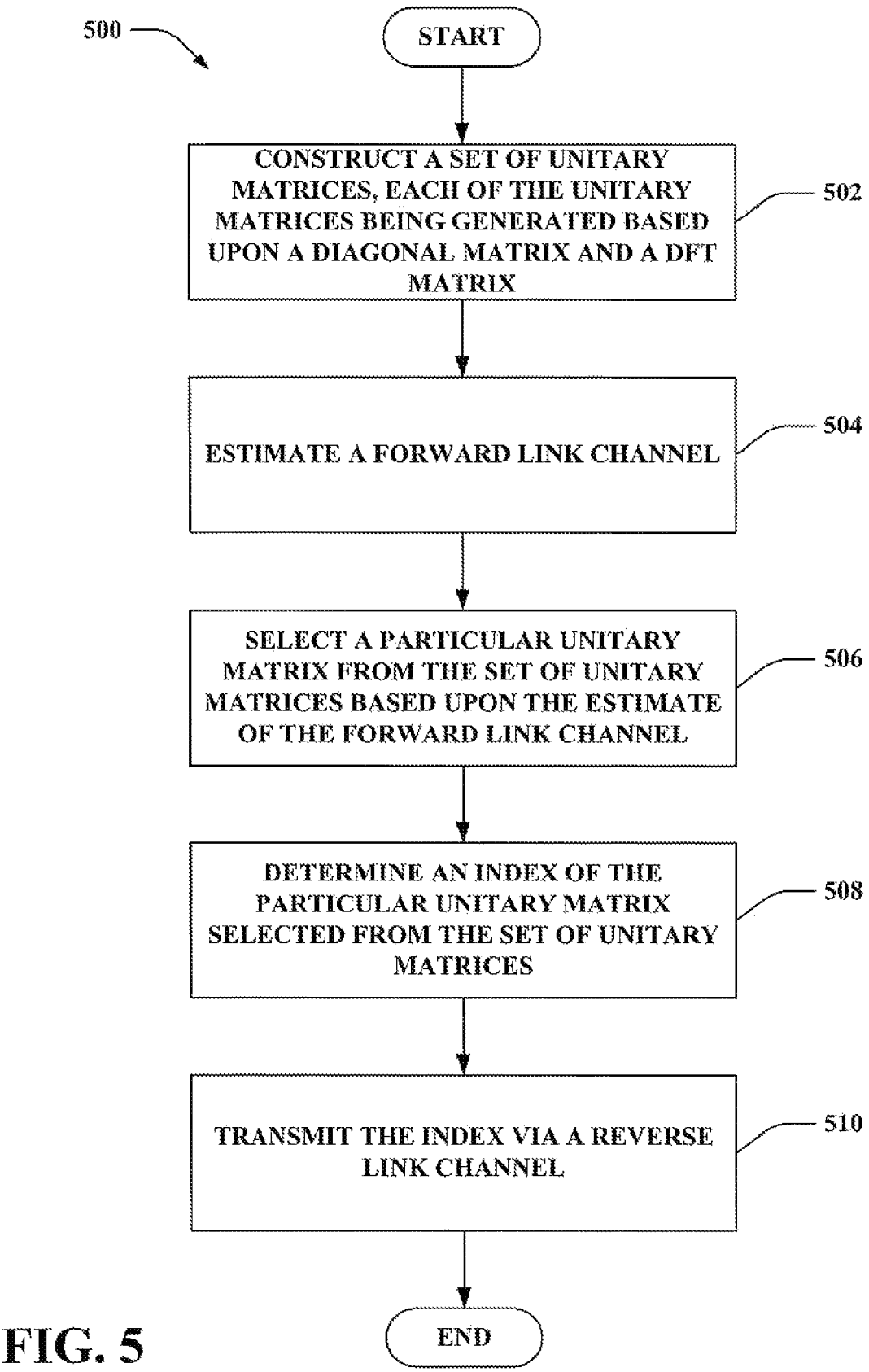
FIG. 5 is an illustration of an example methodology that facilitates providing channel related feedback by leveraging a set of constructed unitary matrices in a MIMO wireless communication system.
Figure 6:
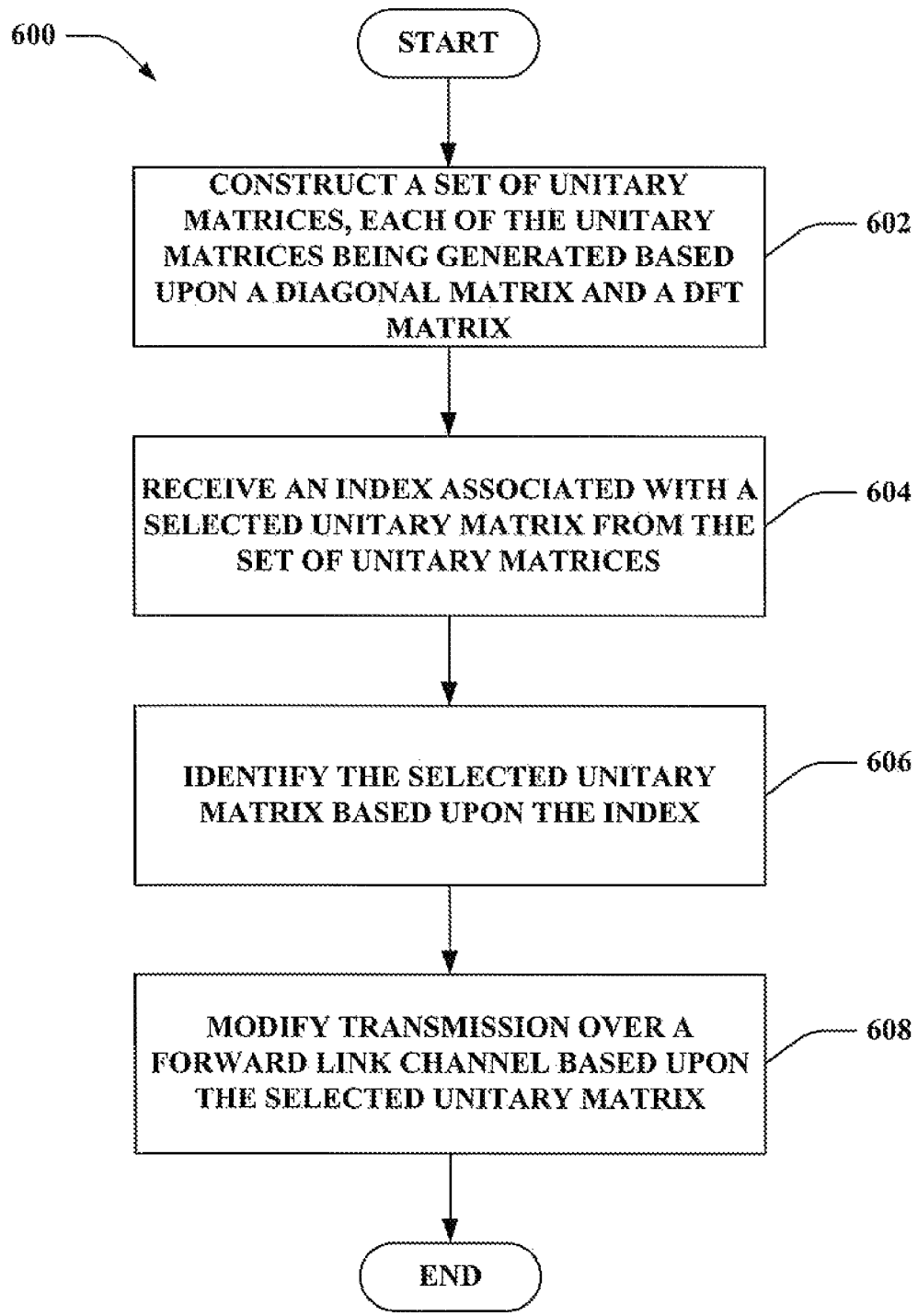
FIG. 6 is an illustration of an example methodology that facilitates controlling transmission over a forward link channel based upon a unitary matrix in a MIMO wireless communication system.

Referring to FIGS. 4-6, methodologies relating to constructing unitary matrices that may be utilized in linear precoding for MIMO systems are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

With reference to FIGS. 4, illustrated is a methodology 400 that facilitates yielding one or more unitary matrices that may be utilized in linear precoding in a MIMO wireless communication system. At 402, a diagonal matrix may be obtained. For instance, the diagonal matrix may be associated with a random phase. Moreover, the diagonal matrix may be substantially any size (e.g., substantially any number of columns and rows). Further, the diagonal matrix may be generated (e.g., by a communications apparatus that obtains the diagonal matrix), received from a disparate source, and so forth. At 404, a DFT matrix may be obtained. The DFT matrix may be a $M_T \times L$ matrix, where $M_T$ may be a number of transmit antennas and L nay be a rank and/or number of space-time codes (e.g., spatial multiplexing streams). The DFT matrix may be generated, received from a disparate source, and the like. At 406, a unitary matrix employed in linear precoding may be constructed based upon the diagonal matrix and the DFT matrix. For example, the diagonal matrix may be multiplied by the DFT matrix to yield the unitary matrix. Further, the unitary matrix as constructed may enable transmission power of each transmit antenna (e.g., employing the unitary matrix) to be substantially equal regardless of a number of streams transmitted.

Now turning to FIG. 5, illustrated is a methodology 500 that facilitates providing channel related feedback by leveraging a set of constructed unitary matrices in a MIMO wireless communication system. At 502, a set of unitary matrices may be constructed, where each of the unitary matrices in the set may be generated based upon a diagonal matrix and a DFT matrix. For example, a set of N unitary matrices may be generated, where N may be substantially any integer. Moreover, M bits of feedback may be utilized to index the unitary matrices, where $N = 2^M$. Pursuant to another example, each of the unitary matrices may be generated by multiplying the diagonal matrix by the DFT matrix. At 504, a forward link channel may be estimated. For example, eigen decomposition may be effectuated to yield a channel related unitary matrix. At 506, a particular unitary matrix, from the set of unitary matrices may be selected based upon the estimate of the forward link channel. According to an example, the particular unitary matrix may be selected by comparing the channel related unitary matrix to the unitary matrices in the set. For instance, a closest unitary matrix to the channel related unitary matrix may be selected; however, the claimed subject matter is not so limited. At 508, an index of the particular unitary matrix selected from the set of unitary matrices may be determined. At 510, the index may be transmitted via a reverse link channel. In accordance with an example, a base station and a mobile device may have a common understanding of the index; thus, the base station may employ the transmitted index to alter subsequent transmission over the forward link channel.

Referring to FIG. 6, illustrated is a methodology 600 that facilitates controlling transmission over a forward link channel based upon a unitary matrix in a MIMO wireless communication system. At 602, a set of unitary matrices may be constructed, where each of the unitary matrices may be generated based upon a diagonal matrix and a DFT matrix. For example, the unitary matrix may be multiplied by the DFT matrix. At 604, an index associated with a selected unitary matrix from the set of unitary matrices may be received. For example, the index may be received via a reverse link channel from a mobile device that utilizes a substantially similar set of unitary matrices. At 606, the selected unitary matrix may be identified based upon the index. At 608, transmission over the forward link channel may be modified based upon the selected unitary matrix. For example, the unitary matrix may be multiplied by a transmit vector to yield a signal to transmit via the forward link channel.

It will be appreciated that, in accordance with one or more aspects described herein, inferences can be made regarding providing channel related feedback, evaluating channel related feedback, utilizing channel related feedback, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting a unitary matrix that may be utilized to provide feedback related to a channel from a set of unitary matrices. By way of further illustration, an inference may be made related to determining a unitary matrix to utilize in connection with modifying transmission over a forward link channel. It will be appreciated that the foregoing examples are illustrative in nature and are not intended to limit the number of inferences that can be made or the manner in which such inferences are made in conjunction with the various embodiments and/or methods described herein.

Figure 7:
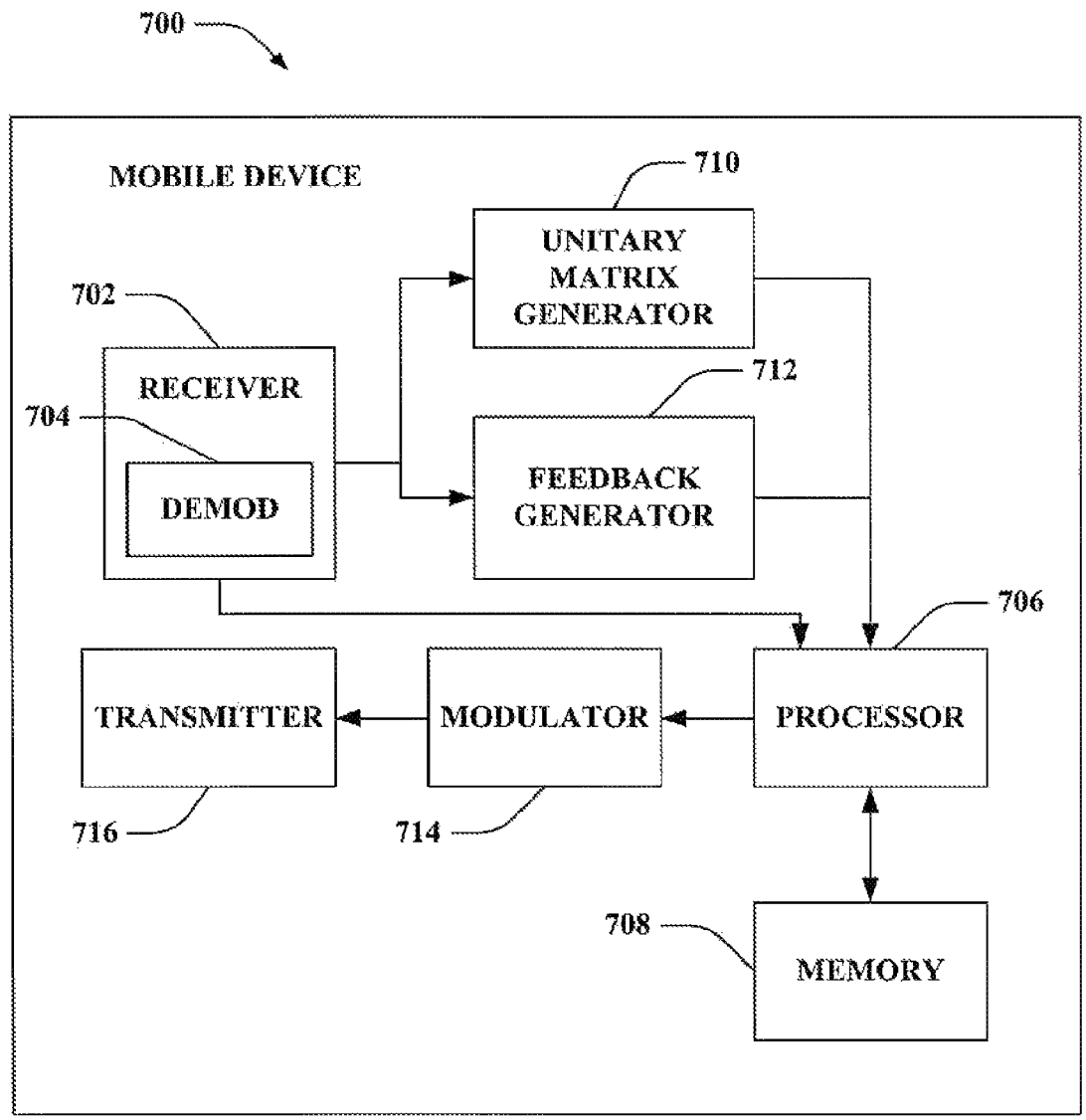
FIG. 7 is an illustration of an example mobile device that facilitates generating a set of unitary matrices that may be employed in linear precoding for a MIMO wireless communication system.

FIG. 7 is an illustration of a mobile device 700 that facilitates generating a set of unitary matrices that may be employed in linear precoding for a MIMO wireless communication system. Mobile device 700 comprises a receiver 702 that receives a signal from, for instance, a receive antenna (not shown), and performs typical actions thereon (e.g., filters, amplifies, downconverts, etc.) the received signal and digitizes the conditioned signal to obtain samples. Receiver 702 can be, for example, an MMSE receiver, and can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that may store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The memory 708 of the subject systems and methods is intended to comprise without being limited to, these and any other suitable types of memory.

Receiver 702 is further operatively coupled to a unitary matrix generator 710 that constructs unitary matrices that can be utilized in linear precoding. For instance, unitary matrix generator 710 may generate a unitary matrix based upon a diagonal matrix and DFT matrix. Pursuant to an example, unitary matrix generator 710 may multiply the diagonal matrix by the DFT matrix to yield the unitary matrix. Moreover, the diagonal matrix may be associated with a random phase. Further, the DFT matrix may be a $M_T \times L$ matrix, where $M_T$ may be a number of transmit antennas and L may be a rank and/or number of space-time codes (e.g., spatial multiplexing streams). Additionally, a feedback generator 712 may utilize the unitary matrices to provide feedback related to a forward link channel. Feedback generator 712 (and/or a disparate component) may estimate the forward link channel. Moreover, based upon the estimated forward link channel, feedback generator 712 may select a particular unitary matrix from the unitary matrices. For instance, an index associated with the selected unitary matrix may be determined by feedback generator 712, and thereafter, the index may be transmitted as feedback over a reverse link channel. Mobile device 700 still further comprises a modulator 714 and a transmitter 716 that transmits the signal to, for instance, a base station, another mobile device, etc. Although depicted as being separate from the processor 706, it is to be appreciated that unitary matrix generator 710, feedback generator 712 and/or modulator 714 may be part of processor 706 or a number of processors (not shown).

Figure 8:
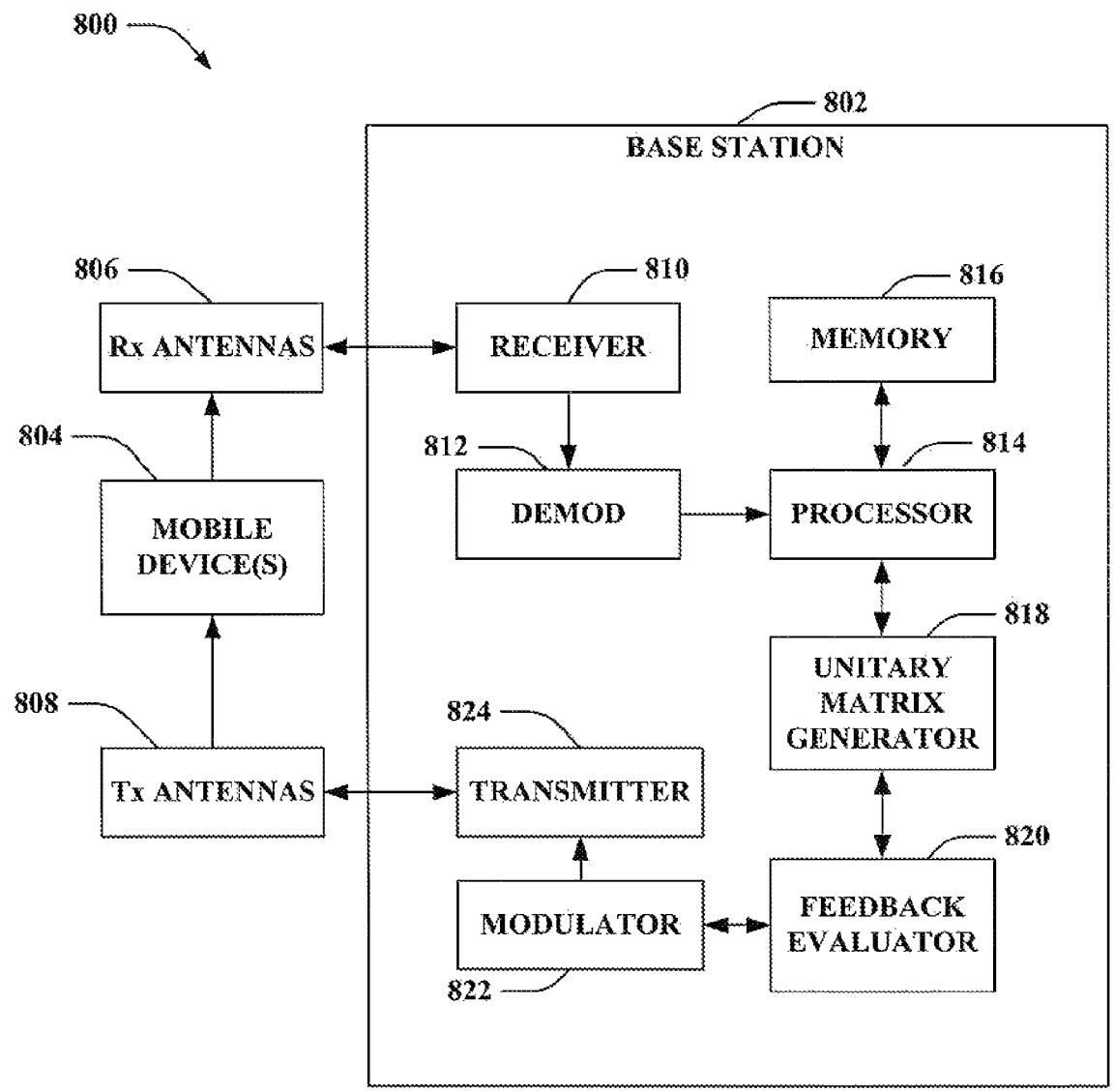
FIG. 8 is an illustration of an example system that facilitates generating unitary matrices and/or utilizing unitary matrices constructed based at least in part upon randomized DFT matrices in connection with linear precoding in a MIMO wireless communication system.

FIG. 8 is an illustration of a system 800 that facilitates generating unitary matrices and/or utilizing unitary matrices constructed based at least in part upon randomized DFT matrices in connection with linear precoding in a MIMO wireless communication system. System 800 comprises a base station 802 (e.g., access point, . . . ) with a receiver 810 that receives signal(s) from one or more mobile devices 804 through a plurality of receive antennas 806, and a transmitter 822 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a unitary matrix generator 818 that constructs unitary matrices based at least in part upon randomized DFT matrices. For example, unitary matrix generator 818 may generate a set of unitary matrices that may be substantially similar to a set of unitary matrices utilized by mobile device(s) 804 in connection with yielding feedback related to a channel obtained by base station 802.

Unitary matrix generator 818 may be further coupled to a feedback evaluator 820 that analyzes feedback received via reverse link channel(s) from mobile devices 804. For example, feedback evaluator 820 may obtain an index related to a selected unitary matrix included in the set of unitary matrices constructed by unitary matrix generator 818. Thus, feedback evaluator 820 may identify the selected unitary matrix. Further, feedback evaluator 820 may effectuate utilizing the selected unitary matrix in connection with subsequent transmission over a forward link channel. Information utilized to control subsequent transmission (e.g., information associated with the selected unitary matrix, the selected unitary matrix combined with a transmit vector, . . . ) may be provided to a modulator 822. Modulator 822 can multiplex the control information for transmission by a transmitter 826 through antenna 808 to mobile device(s) 804. Although depicted as being separate from the processor 814, it is to be appreciated that implicit feedback evaluator 818, explicit feedback evaluator 820 and/or modulator 822 may be part of processor 814 or a number of processors (not shown).

Figure 9:
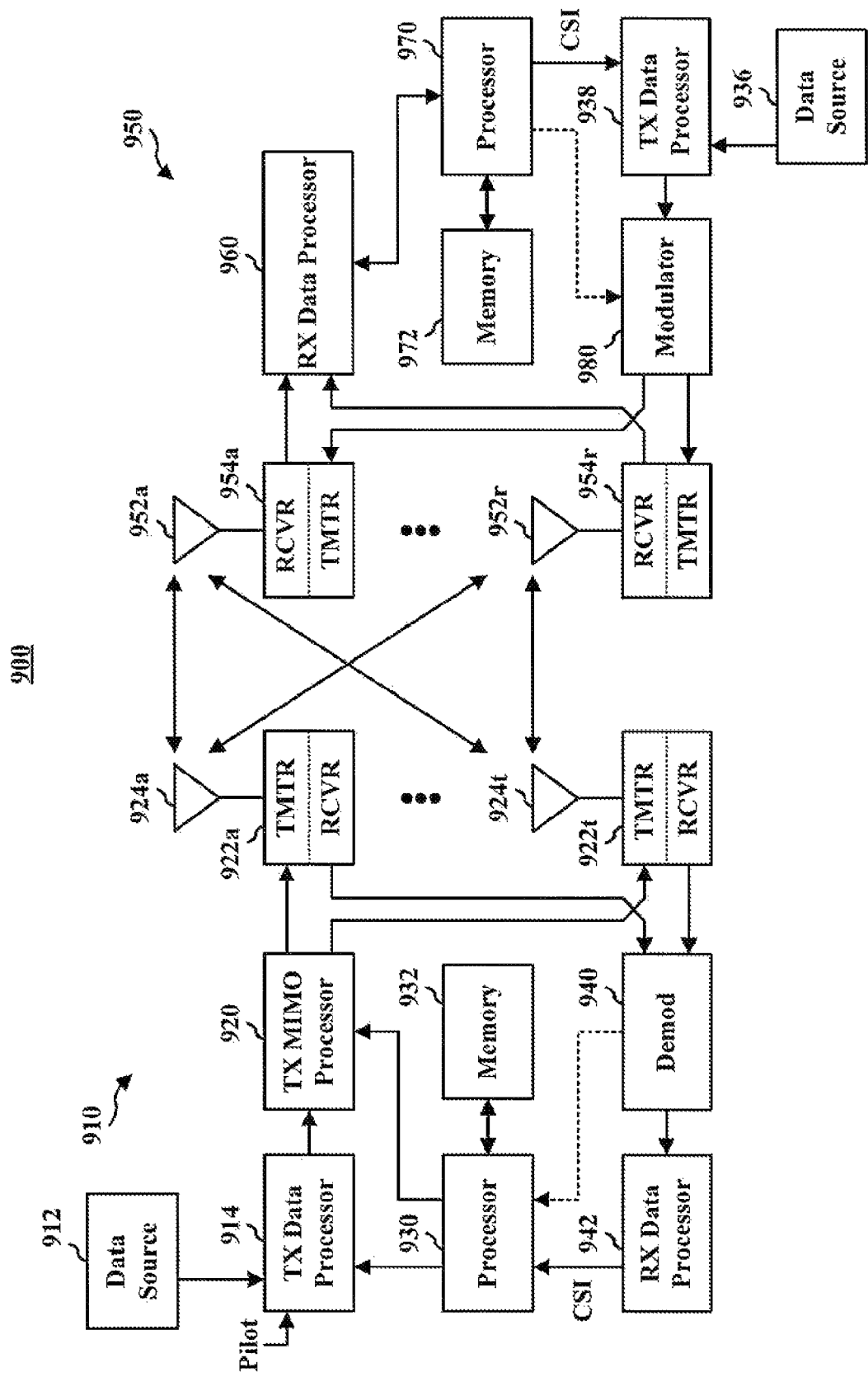
FIG. 9 is an illustration of an example wireless network environment that can be employed in conjunction with various systems and methods described herein.

FIG. 9 shows an example wireless communication system 900. The wireless communication system 900 depicts one base station 910 and one mobile device 950 for sake of brevity. However, it is to be appreciated that system 900 may include more than one base station and/or more than one mobile device, wherein additional base stations and/or mobile devices may be substantially similar or different from example base station 910 and mobile device 950 described below. In addition, it is to be appreciated that base station 910 and/or mobile device 950 may employ the systems (FIGS. 1-3 and 7-8) and/or methods (FIGS. 4-6) described herein to facilitate wireless communication there between.

At base station 910, traffic data for a number of data streams is provided from a data source 912 to a transmit (TX) data processor 914. According to an example, each data stream may be transmitted over a respective antenna. TX data processor 914 formats, codes, and interleaves the traffic data stream based on a particular coding scheme selected for that data stream to provide coded data.

The coded data for each data stream may be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and may be used at mobile device 950 to estimate channel response. The multiplexed pilot and coded data for each data stream may be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream may be determined by instructions performed or provided by processor 930.

The modulation symbols for the data streams may be provided to a TX MIMO processor 920, which may further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 may receive and process the $N_R$ received symbol streams from $N_R$ receivers 954 based on a particular receiver processing technique to provide $N_T$ "detected" symbol streams. RX data processor 960 may demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 may periodically determine which precoding matrix to utilize as discussed above. Further, processor 970 may formulate a reverse link message comprising a matrix index portion and a rank value portion.

The reverse link message may comprise various types of information regarding the communication link and/or the received (data stream. The reverse link message may be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 may process the extracted message to determine which precodinig matrix to use for determining the beamforming weights.

Processors 930 and 970 may direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 10:
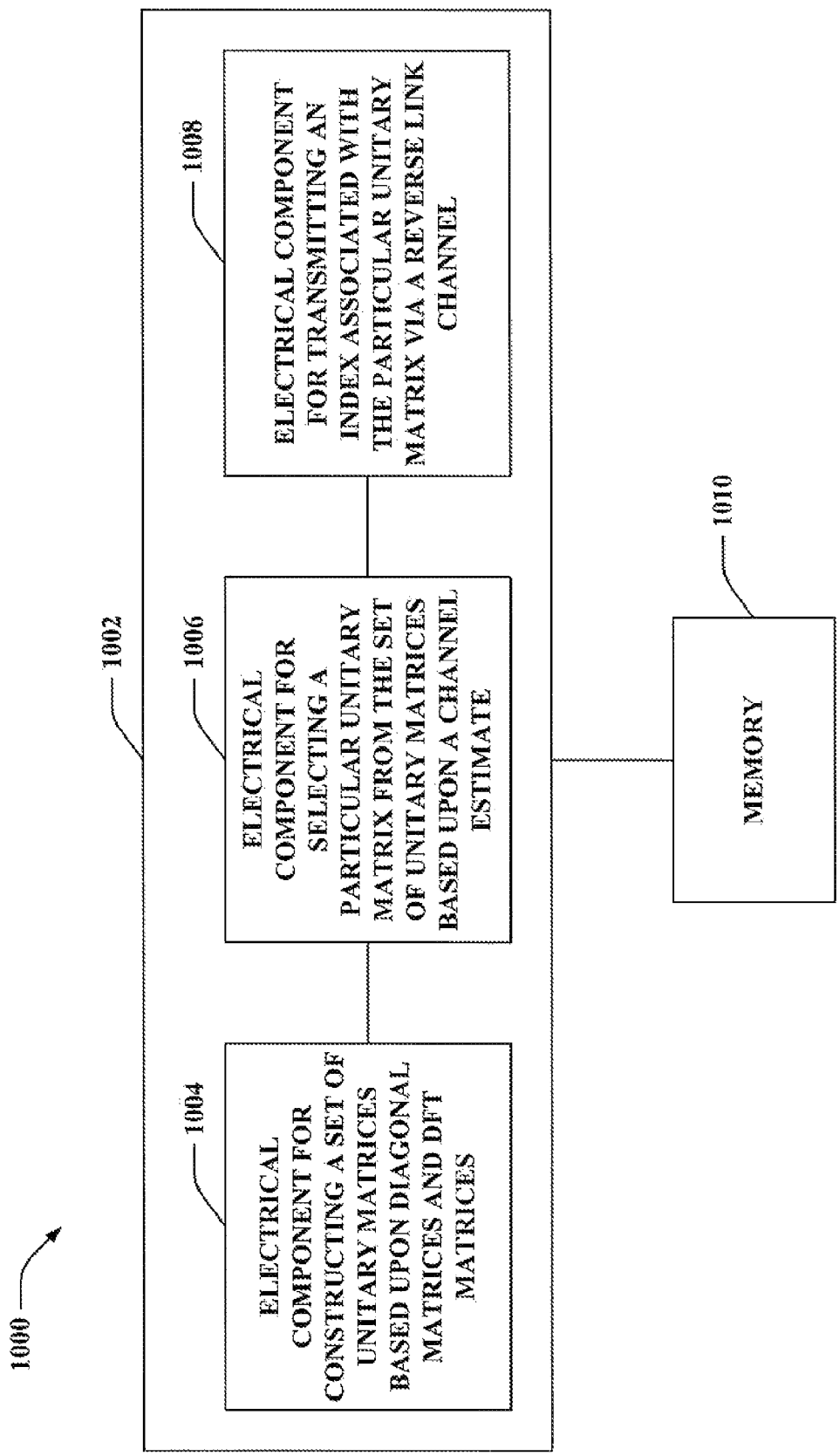
FIG. 10 is an illustration of an example system that generates unitary matrices and provides channel related feedback by leveraging the unitary matrices in a MIMO wireless communication environment.

With reference to FIG. 10, illustrated is a system 1000 that generates unitary matrices and provides channel related feedback by leveraging the unitary matrices in a MIMO wireless communication environment. For example, system 1000 may reside at least partially within a mobile device. It is to be appreciated that system 1000 is represented as including functional blocks, which may be functional blocks that represent functions implemented by a processor, software, or combination thereof (e.g., firmware). System 1000 includes a logical grouping 1002 of electrical components that may act in conjunction. For instance, logical grouping 1002 may include an electrical component for constructing a set of unitary matrices based upon diagonal matrices and DFT matrices 1004. For example, a diagonal matrix may be combined with (e.g., multiplied by) a DFT matrix to yield a unitary matrix. Further, logical grouping 1002 may comprise an electrical component for selecting a particular unitary matrix from the set of unitary matrices based upon a channel estimate 1006. According to an example, a forward link channel may be estimated, and the channel estimate (and/or a corresponding channel related unitary matrix) may be compared to the set of unitary matrices. Moreover, logical grouping 1002 may include an electrical component for transmitting an index associated with the particular unitary matrix via a reverse link channel 1008. Additionally, system 1000 may include a memory 1010 that retains instructions for executing functions associated with electrical components 1004, 1006 and 1008. While shown as being external to memory 1010, it is to be understood that one or more of electrical components 1004, 1006 and 1008 may exist within memory 1010.

Figure 11:
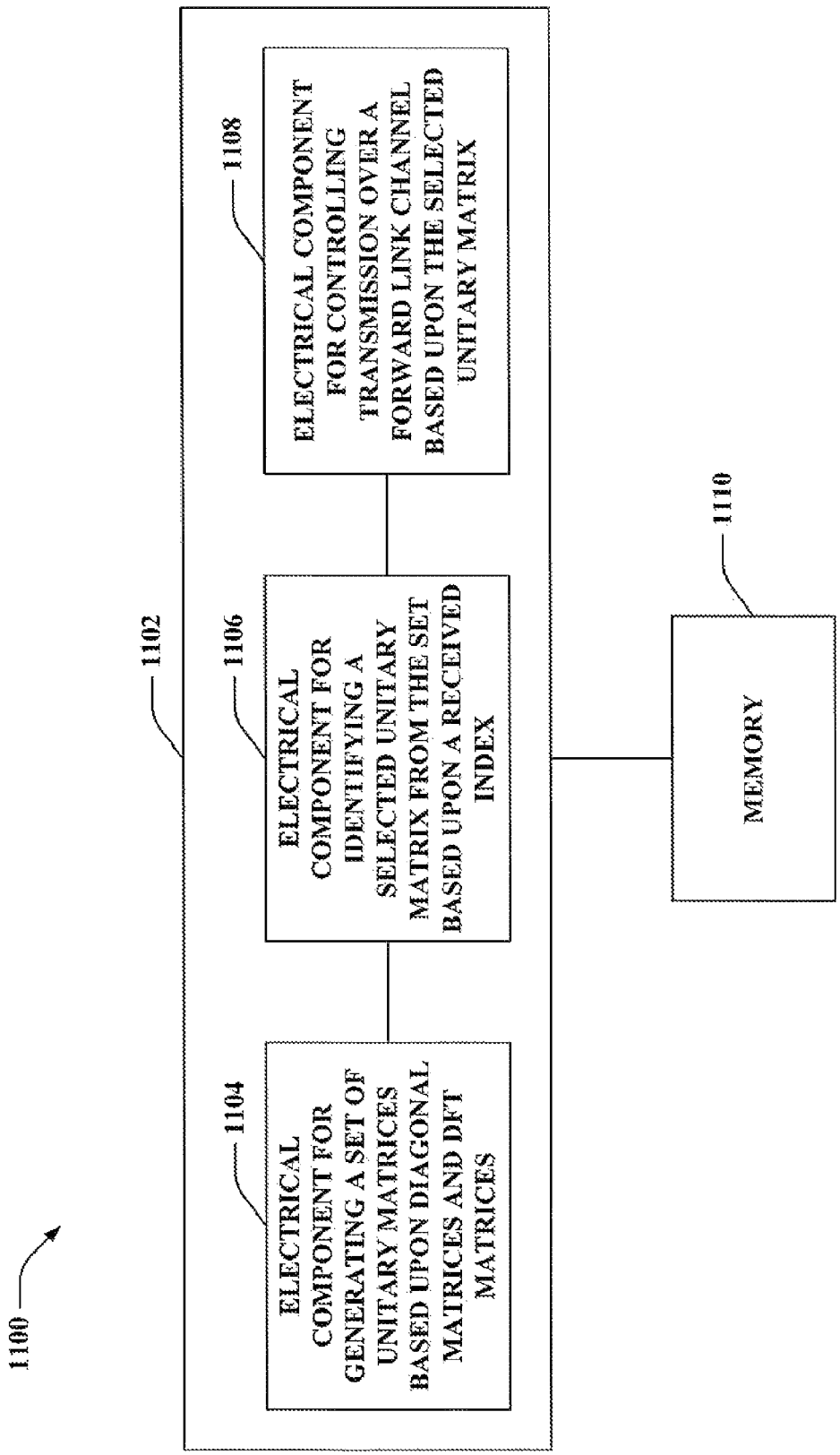
FIG. 11 is an illustration of an example system that constructs unitary matrices and controls transmission over a channel by employing the unitary matrices in a MIMO wireless communication environment.

Turning to FIG. 11, illustrated is a system 1100 that constructs unitary matrices and controls transmission over a channel by employing the unitary matrices in a MIMO wireless communication environment. System 1100 may reside within a base station, for instance. As depicted, system 1100 includes functional blocks that may represent functions implemented by a processor, software, or combination thereof (e.g., firmware). System 1100 includes a logical grouping 1102 of electrical components that facilitate constructing unitary matrices and controlling transmission over a channel. Logical grouping 1102 may include an electrical component for generating a set of unitary matrices based upon diagonal matrices and DFT matrices 1104. Moreover, logical grouping 1102 may include an electrical component for identifying a selected unitary matrix from the set of unitary matrices based upon a received index 1106. For example, the index may be obtained from a mobile device that utilizes a substantially similar set of unitary matrices to yield the index. Further, logical grouping 1102 may include an electrical component for controlling transmission over a forward link channel based upon the selected unitary matrix 1108.

Additionally, system 1100 may include a memory 1110 that retains instructions for executing functions associated with electrical components 1104, 1106, and 1108. While shown as being external to memory 1110, it is to be understood that electrical components 1104, 1106, and 1108 may exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates controlling transmission in response to feedback in a wireless communication system, comprising:
   constructing a set of unitary matrices, each of the unitary matrices being generated based upon a diagonal matrix and a Discrete Fourier Transform (DFT) matrix, wherein the set of unitary matrices includes a first cluster of unitary matrices, the first cluster of unitary matrices including a subset of the set of unitary matrices;
   identifying a selected unitary matrix from the constructed set of unitary matrices based upon a received index, wherein the selected unitary matrix corresponds to a channel unitary matrix derived by a mobile device from forward link channel estimations;
   determining whether the selected unitary matrix is included in the first cluster of unitary matrices; and
   modifying transmission over the forward link channel based upon the selected unitary matrix being included in the first cluster of unitary matrices;
   wherein the modifying transmission over the forward link channel further comprises utilizing substantially equal transmission power for each transmit antenna based upon the selected unitary matrix.

2. The method of claim 1, wherein the modifying transmission over the forward link channel includes multiplying the selected unitary matrix by a transmit vector to yield a signal to transmit via the forward link channel.

3. The method of claim 1, wherein the method includes constructing each of the unitary matrices by multiplying the diagonal matrix by the DFT matrix.

4. The method of claim 3, wherein the diagonal matrix is associated with a random phase.

5. The method of claim 4, wherein the DFT matrix is a $M_T$ by L matrix, $M_T$ is a number of transmit antennas and L is a rank of space-time codes.

6. The method of claim 5, wherein the wireless communications system is a multiple-input multiple-output (MIMO) system.

7. The method of claim 4, wherein the random phase is selected from a uniform random variable between 0 and $2\pi$.

8. The method of claim 1, wherein the set of unitary matrices is substantially similar to a set of unitary matrices employed by the mobile device from which the index is received.

9. The method of claim 8, wherein the index corresponds to a unitary matrix selected from the set of unitary matrices employed by the mobile device.

10. The method of claim 1, wherein the wireless communications system is at least one of a time division duplex (TDD) system and a frequency division duplex (FDD) system.

11. The method of claim 1, wherein the method includes effectuating beamforming based upon the selected unitary matrix.

12. The method of claim 1, wherein the set of unitary matrices includes a second cluster of unitary matrices, and wherein the method includes scheduling transmissions to other mobile devices based on the second cluster of matrices in response to a determination that the selected unitary matrix is included in the first cluster of unitary matrices, wherein the second cluster of unitary matrices is distinct from the first cluster of unitary matrices.

13. The method of claim 12, wherein the determination of whether the selected unitary matrix is included in the first cluster of unitary matrices is based on a value of the received index, wherein, when the value of the received index corresponds to a first index value, the selected unitary matrix corresponds to a randomly selected unitary matrix, and wherein, when the value of the received index corresponds to a second index value, the selected unitary matrix identifies one or more transmission beams associated with the first cluster of unitary matrices.

14. A wireless communications apparatus, comprising:
   a memory that retains instructions for:
      constructing a set of unitary matrices, each of the unitary matrices being generated based upon a diagonal matrix and a Discrete Fourier Transform (DFT) matrix, wherein the set of unitary matrices includes a first cluster of unitary matrices, the first cluster of unitary matrices including a subset of the set of unitary matrices;
      identifying a selected unitary matrix from the constructed set of unitary matrices based upon a received index, wherein the selected unitary matrix corresponds to a channel unitary matrix derived by a mobile device from forward link channel estimations;
      determining whether the selected unitary matrix is included in the first cluster of unitary matrices; and
      modifying transmission over the forward link channel based upon the selected unitary matrix being included in the first cluster of unitary matrices, wherein the controlling transmission includes utilizing substantially equal transmission power for each transmit antenna based upon the selected unitary matrix; and
   a processor, coupled to the memory, configured to execute the instructions retained in memory.

15. The wireless communications apparatus of claim 14, wherein the memory includes instructions for multiplying the diagonal matrix by the DFT matrix to yield the unitary matrices, wherein the diagonal matrix is associated with a random phase, and wherein the DFT matrix is a $M_T$ by L matrix, $M_T$ is a number of transmit antennas and L is a rank of space-time codes.

16. A wireless communications apparatus that constructs unitary matrices and controls transmission over a channel, comprising:
   means for constructing a set of unitary matrices, each of the unitary matrices being generated based upon a diagonal matrix and a Discrete Fourier Transform (DFT) matrix, wherein the set of unitary matrices includes a first cluster of unitary matrices, the first cluster of unitary matrices including a subset of the set of unitary matrices;

means for identifying a selected unitary matrix from the constructed set of unitary matrices based upon a received index, wherein the selected unitary matrix corresponds to a channel unitary matrix derived by a mobile device from forward link channel estimations;

determining whether the selected unitary matrix is included in the first cluster of unitary matrices; and means for modifying transmission over the forward link channel based upon the selected unitary matrix being included in the first cluster of unitary matrices;

wherein the means for modifying transmission over the forward link channel utilizes substantially equal transmission power for each transmit antenna based upon the selected unitary matrix.

17. The wireless communications apparatus of claim 16, wherein the means for modifying transmission over the forward link channel is configured to multiply the selected unitary matrix with a transmit vector to yield a signal for transmission over the forward link channel.

18. A machine-readable non-transitory medium having stored thereon machine-executable instructions for:

constructing a set of unitary matrices, each of the unitary matrices being generated based upon a diagonal matrix and a Discrete Fourier Transform (DFT) matrix, wherein the set of unitary matrices includes a first cluster of unitary matrices, the first cluster of unitary matrices including a subset of the set of unitary matrices;

identifying a selected unitary matrix from the constructed set of unitary matrices based upon a received index, wherein the selected unitary matrix corresponds to a channel unitary matrix derived by a mobile device from forward link channel estimations;

determining whether the selected unitary matrix is included in the first cluster of unitary matrices; and modifying transmission over the forward link channel based upon the selected unitary matrix being included in the first cluster of unitary matrices, wherein the modifying the transmission includes utilizing substantially equal transmission power for each transmit antenna based upon the selected unitary matrix.

19. The machine-readable medium of claim 18, wherein the constructed set of unitary matrices includes N unitary matrices, where N is an integer.

20. In a wireless communication system, an apparatus comprising:

a processor configured to:

construct a codebook that includes a set of unitary matrices, each of the unitary matrices being generated based upon a diagonal matrix and a Discrete Fourier Transform (DFT) matrix, wherein the codebook includes a first cluster of unitary matrices, the first cluster of unitary matrices including a subset of the set of unitary matrices;

identify a selected unitary matrix from the constructed set of unitary matrices based upon a received index, wherein the selected unitary matrix corresponds to a channel unitary matrix derived by a mobile device from forward link channel estimations;

determine whether the selected unitary matrix is included in the first cluster of unitary matrices; and modify transmission over the forward link channel based upon the selected unitary matrix being included in the first cluster of unitary matrices;

wherein the processor configured to modify transmission is further configured to utilize substantially equal transmission power for each transmit antenna based upon the selected unitary matrix.

* * * * *